June 5, 1951 J. W. EVERETT 2,555,791

MAGNETIC REPULSION AND ATTRACTION DEVICE

Filed June 4, 1945

INVENTOR

James W. Everett

By Banning & Banning & Robertson
Attys

Patented June 5, 1951 2,555,791

UNITED STATES PATENT OFFICE 2,555,791

MAGNETIC REPULSION AND ATTRACTION DEVICE

James W. Everett, La Fayette, Ind., assignor to Duncan Electric Manufacturing Company, La Fayette, Ind., a corporation of Illinois Application June 4, 1945, Serial No. 597,561

1 Claim. (Cl. 175—341)

In polyphase watt-hour meters, the meter disk is driven by two driving elements, either one of which is capable of driving the disk. Hence the meter reader can not be sure that the meter is operating properly merely because the disk is rotating. The disk would rotate even if the potential circuit of one of the driving elements were open circuited.

According to prior practice, a potential indicator is connected with the potential coil of each driving element and is constructed so as to display the word "on" if current is flowing through the potential coil and "off" otherwise.

According to the present invention, a much simpler form of potential indicator is provided than has been available heretofore. One of the problems which made simplicity difficult was the problem of providing an adequate movement or throw of the armature to account for displacing one word by another. According to the present invention, this is accomplished through the aid of repelling magnetic forces in the first part of the movement and attracting magnetic forces in the latter part of the movement.

Additional objects and advantages will be apparent from the following description and from the drawings; in which, Figure 1 is a perspective view of a preferred form of potential indicator chosen for illustration;

Although the law requires a full and exact description of at least one form of the invention such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

Figure 1:
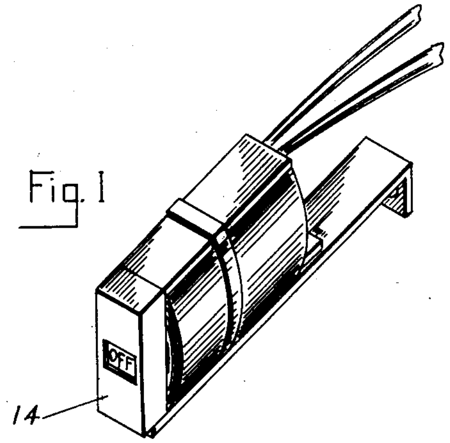
Figure 2:
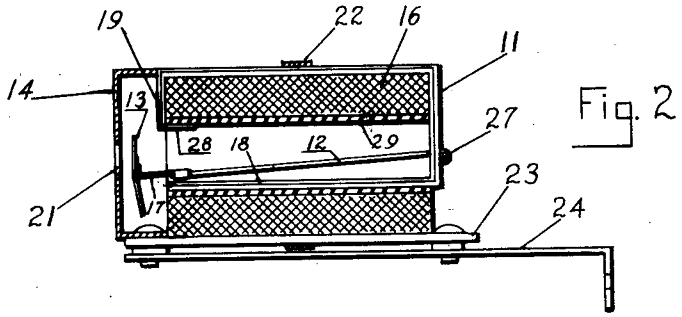
Fig. 2 is a vertical, sectional view taken through the structure of Fig. 1.
Figure 4:
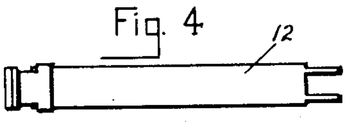
Fig. 4 is a top view of the armature assembly before application to the yoke.

The illustrated forms of the indicator include a yoke or magnetic core 11, an armature 12, a target 13 carried by the armature, a mask 14 for exposing a desired part of the target and a coil 16. The armature 12 and yoke 11 are, of course, of magnetic material. The target 13 including the clip 17 are of non-magnetic material. When the coil is de-energized, the armature will fall to the position shown in Fig. 2. When the coil is energized, armature 12 and lower leg 18 will be magnetized, with the result that they will repell one another and the armature will be raised. The upper leg of the yoke terminating in pole 19 is oppositely polarized with the result that pole 19 will attract the free end of armature 12. With the parts in the position shown in Fig. 2, however, the attraction would be too weak to raise the armature. By the time the armature has been raised perhaps half-way by repulsion, the attraction is increased sufficiently so that it will raise the armature the rest of the way, exposing the lower half of the target 13 through the aperture 21 of the mask 14. The pole 19 preferably extends approximately to the aperture through the coil so as to attract the armature as strongly as possible.

Figure 3:
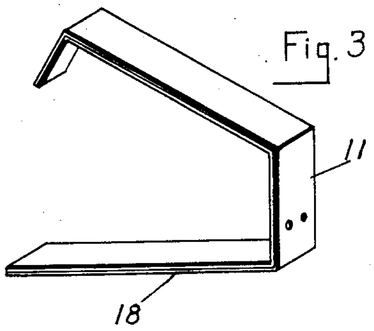
Fig. 3 is a perspective view of the yoke structure before the coil has been applied thereto.
Figure 5:
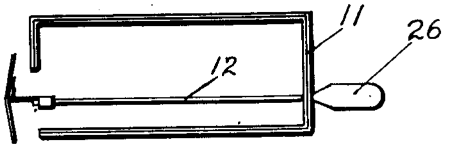
Fig. 5 is a side view of a modified yoke and armature assembly.
Figure 6:
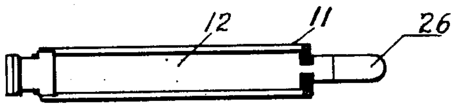
Fig. 6 is a plan view of the armature assembly in Fig. 5, showing the yoke in section.

The structure is exceedingly simple. The yoke may be formed as seen in Fig. 3. After the lower leg 18 thereof has been slipped into the coil, the upper leg will be bent down and held down by a retaining band 22 which could, for example, be a soldered metal band, a twisted wire, or even an adhesive fabric.

This band may secure the coil and core assembly to a base plate 23, which in turn may be riveted to a mounting bracket 24. The mask 14 may be riveted also to the mounting bracket.

The structure is not only exceptionally simple, but it is also very efficient and economical, consuming much less power than its predecessors. If still smaller consumption should be required, the armature may be counterbalanced by a counterbalance 26 which, by being anchored to the tail or tails of the armature, may also serve to hold the armature in place. If this is not used, the tails may merely be curled as seen at 27. When a counterweight is used, it could be adjustable along the tail of the armature to vary the energy required to operate the armature.

The magnetic portion of the armature 12 is preferably slightly too short to reach the pole 19. Accordingly, the pole 19 will exert a longitudinal pull on the armature thereby keeping the curled tail portions 27 drawn against the yoke 11 so as to minimize the danger of a hum or vibration due to the alternating current. Of course, if desired, some form of resilient take-up may be provided in connection with the hinging of armature 12 to yoke 11 so as to completely eliminate danger of vibration.

It may also be desired to provide a felt pad 28 within the aperture of the coil and against which the armature will come to rest in its actuated position. This pad may be cemented to the paper tube 29 about which the coil 16 is wound.

The yoke 11 will be laminated to minimize eddy currents. Although the drawings only indicate two laminations, three are, at present, contemplated.

From the foregoing, it is seen that an exceptionally simple and efficient indicator, suitable for use as a potential indicator, has been devised.

I claim:

A magnetic device including an apertured coil, a yoke of magnetic metal associated with the coil, having two legs connected integrally by a base to be substantially U-shaped, extending from adjacent the front end of the coil through the aperture, along one end of the aperture, along the outside of the coil to the front end and inwardly approximately to the aperture, an armature disposed in the aperture of the coil and pivotally mounted to provide a free end at the front of the coil, movable from adjacent the pole formed by the front end of the leg of the core within the coil to adjacent the pole formed by the end of the inwardly-extending portion of the outer leg, said free end of the armature when adjacent the pole of the inner leg lying directly opposite the pole and both terminating approximately at the front end of the coil, and said free end when adjacent the pole of the inner leg being spaced from the pole formed by the inwardly-extending portion of the outer leg materially in excess of the minimum yoke dimension whereby repulsion between the free end and the pole of the inner leg is a substantial portion of the force moving the free end of the armature toward the outer leg, said yoke being uniform in width and thickness and being formed of a plurality of laminations of sheet material with their flat faces parallel to the pivotal axis of the armature.

JAMES W. EVERETT.

REFERENCES CITED

The following references are of record in the file of this patent:

UNITED STATES PATENTS

| Number | Name | Date |
|---|---|---|
| 19,379 | Parks | Feb. 16, 1858 |
| 260,306 | Markland | June 27, 1882 |
| 749,399 | Pickard | Jan. 12, 1904 |
| 1,436,327 | Ward | Nov. 22, 1922 |
| 1,876,295 | Hofgaard | Sept. 6, 1932 |
| 2,179,792 | Lappin | Nov. 14, 1939 |
| 2,360,008 | Nelsen | Oct. 10, 1944 |
| 2,373,479 | Knowles et al. | Apr. 10, 1945 |
| 2,379,542 | Rempt | July 3, 1945 |
| 2,388,449 | Sundt et al. | Nov. 6, 1945 |
| 2,436,354 | Burke | Feb. 17, 1948 |

FOREIGN PATENTS

| Number | Country | Date |
|---|---|---|
| 28,824 | Great Britain | June 21, 1912 |
| 457,540 | Great Britain | Nov. 30, 1936 |
| 175,083 | Great Britain | Feb. 16, 1922 |
| 349,203 | France | May 17, 1905 |